United States Patent [19]
Tompkins et al.

[11] Patent Number: 5,655,062
[45] Date of Patent: Aug. 5, 1997

[54] ACCENT COLOR PRINTING

[75] Inventors: Michael P. Tompkins; Stephen C. Deeley, both of Rochester; W. James Colosky, Honeoye Falls; Steven L. Friesen, Hilton, all of N.Y.

[73] Assignee: Eastman Kodak Company, Rochester, N.Y.

[21] Appl. No.: 398,199

[22] Filed: Mar. 2, 1995

[51] Int. Cl.$^6$ .................................................. G06K 15/00
[52] U.S. Cl. .................................................. 395/109
[58] Field of Search .................................. 395/109, 131; 358/501, 537, 530; 355/328, 326 R; 347/115

[56] References Cited

U.S. PATENT DOCUMENTS

| | | | |
|---|---|---|---|
| 3,914,043 | 10/1975 | McVeigh | 355/326 R |
| 4,857,955 | 8/1989 | Crandall | 395/109 |
| 5,323,487 | 6/1994 | Morita et al. | 395/109 |
| 5,493,386 | 2/1996 | Thompson | 355/328 |

*Primary Examiner*—Scott A. Rogers
*Attorney, Agent, or Firm*—Thomas H. Close

[57] ABSTRACT

Method and apparatus for printing a color document file having page description commands including process color commands for graphic objects and bitmapped images on an accent color printer. A particular accent color and shade is assigned to each primary color and a particular accent color is assigned to all bitmapped images. A print driver responsive to the color document file and particular color assignments adds color mapping parameters to the color document file to produce a modified color document file. A raster image processor connected to the print driver and responsive to the modified color document file maps the process color commands in the color document file to a shade of a particular accent color for each graphic object, maps the process color commands for all bitmapped images to a specified accent color, and produces a plurality of full page bitmaps, one for each accent color. A print engine capable of printing a plurality of accent color s, is connected to the raster image processor for receiving the full page bitmaps and prints the accent color document. The color document file is supplied to the print driver and raster image processor for printing the accent color document.

16 Claims, 1 Drawing Sheet

ACCENT COLOR PRINTING

The disclosure in the appendix contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to printing systems for printing color documents, and more particularly to such printing systems with capability for printing accent color.

BACKGROUND OF THE INVENTION

Computer users have the ability to add color to their documents using popular application software for desktop publishing, spreadsheets, forms, etc. As used herein, the term document refers to a visual display of a graphical image, whether on a CRT or on paper, and the digital data required to generate the visual display is called a document file. Typically, if a user wishes to print a color document, the document file is sent to a process color printing system. Process color is defined as the mixing of toners to obtain a particular hue and saturation of a given color. Process color printing systems commonly use cyan, magenta, yellow and black toners to create colors. Various combinations of color toners are mixed or overlaid to create a desired color. A process color printer generally makes four (4) passes to print a color document, one pass for each of the process color toners available in the printer. When a color document is sent to a process color printing system, the colors seen on the display when viewing the document are similar to the colors on the printed output.

Accent color is becoming commonplace in today's business environment. A significant volume of color work can satisfactorily and economically be accomplished by accent color printers. Accent color is defined as using the toners installed in an accent color printer to represent a process color without any mixing or overlaying of toners. Shades of a color are depicted using a percentage of a particular toner. Some printers that do accent color printing also do shading by creating patterns with a combination of black plus a color toner to produce different shades of a particular color without actually placing one color of toner on top of another color of toner. Document preparers use accent color for a variety of purposes, including logos, signatures, forms, highlighting key topics of a document, emphasis on variable data and personalized information. Because an accent color printer may require fewer passes to print an accent color document, accent color printing can be faster and less expensive than process color printing. If a document has only black, red and blue, three (3) passes are required versus four (4) passes for a four color process color printer. Since the tolerances for color registration in an accent color marking engine can be less than for a process color marking engine, an accent color marking engine can be manufactured less expensively than a process color marking engine.

A current challenge with printing color documents on an accent color printer is how to change a process color specification, which typically requires four toners, to an accent color specification using fewer than four color toners. Another challenge is how to represent colors that are darker than a pure color that is normally represented by 100% of a toner. When generating business graphics or documents, a document preparer is concerned with highlighting information using color but is not necessarily as concerned with matching a particular color.

An example of a printer that is designed to print accent color is the Xerox 4890, manufactured by Xerox Corp., Rochester, N.Y. The Xerox 4890 prints black plus one accent color. To process accent color documents, the Xerox 4890 employs a file server, called a FIBRE™ server, that is installed in front of the 4890 controller to convert a document file having process color data to a best accent color match. Commands are inserted by the file server into the document file to specify where accent color is to be used. If blue is available in the Xerox 4890 printer, all blue colors in the document are represented as a combination of black and blue toner, with all other colors represented as a shade of gray. The Xerox 4890 printer limits the user to only one accent color for a document.

It would be desirable to have a system that is capable of providing more than one accent color and which provides an efficient process for mapping process color commands to the toner colors available on the accent color printer. It would also be desirable to have such a system that would produce aesthetically pleasing results.

SUMMARY OF THE INVENTION

The object of this invention is to provide an accent color printer having more than one accent colors, wherein the output of the printer is an accent color representation of process color commands in a document file. The present invention differs from the prior art in that it provides for the processing of process color information into more than one accent colors. It is relatively easy to map all colors that are not black to a single accent color, but it is much more difficult to map process colors to multiple accent colors. The printing of color documents should require no extra steps than are already necessary. It is the object of the present invention, to provide print drivers for a particular host computer platform (e.g. PC and Macintosh) that enable multiple accent color printing and that give the user the ability to map process colors to multiple accent colors. It is a further object to provide an accent color mapping method that receives process color specifications and maps the color to an appropriate accent color It is a still further object to ensure that no toner overlay will take place as a result of the accent color mapping.

The objects of the present invention are achieved by providing a method and apparatus for printing a color document file having page description commands including process color commands for graphic objects and bitmapped images on an accent color printer. A particular accent color and shade is assigned to each primary color and a particular accent color is assigned to all bitmapped images. A print driver responsive to the color document file and particular color assignments adds color mapping parameters to the color document file to produce a modified color document file. A raster image processor connected to the print driver and responsive to the modified color document file maps the process color commands in the color document file to a shade of a particular accent color for each graphic object, maps the process color commands for all bitmapped images to a specified accent color, and produces a plurality of full page bitmaps, one for each accent color. A print engine capable of printing a plurality of accent color s, is connected to the raster image processor for receiving the full page bitmaps and prints the accent color document. The color document file is supplied to the print driver and raster image processor for printing the accent color document.

ADVANTAGES OVER PRIOR ART

One of the main advantages of the present invention over the prior art is that there are no extra steps involved and no extra hardware or software required than is normally used to produce accent color documents on current accent color printing systems. The user is not restricted in their selection of color within their documents and has the ability through the print drivers to map the display colors to printer colors for colors they know aren't available on the marking engine. The invention also provides the advantage of having more than one accent color capability on a page by page basis. Since the accent color process makes it possible for the accent color printer to only make as many passes as necessary for each page, there is a distinct time advantage for an accent color printer versus a process color printer.

DETAILED DESCRIPTION OF THE INVENTION

Figure 1:
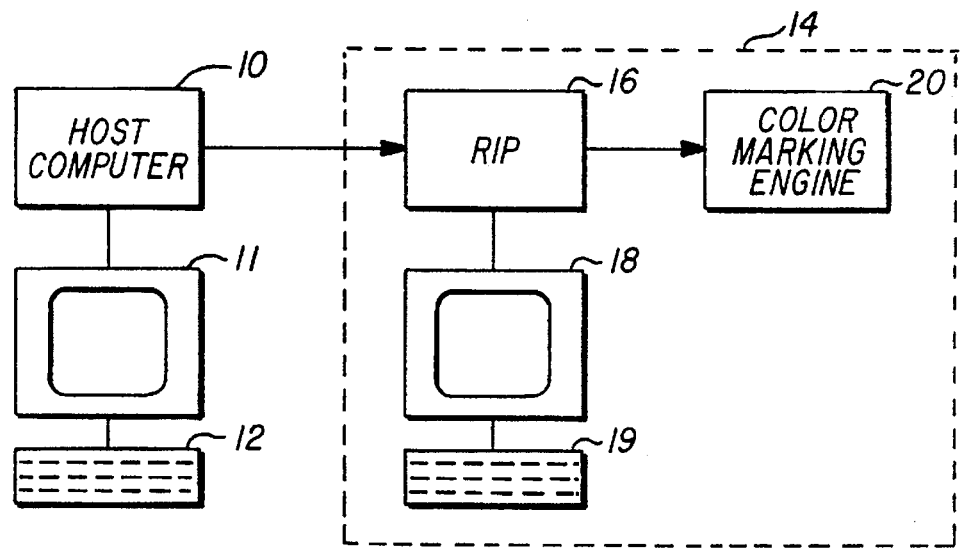
FIG. 1 is a schematic diagram illustrating a printing system useful in practicing the present invention.

Referring now to FIG. 1, there is shown a block diagram of a color printing system that is capable of scanning and printing monochrome documents and adding multiple accent colors to scanned documents. A suitable color printing system that has been configured to operate according to the present invention is the Kodak 1580 Copier-Printer, available from the Eastman Kodak Co., Rochester, N.Y. According to FIG. 1, a host computer 10 has a monitor 11 and a keyboard 12 attached to the computer for creating process color documents. The host computer 10 is connected to a color printing system 14 by communication lines 15. The process color document files are processed by a raster image processor (RIP) 16 and passed on to a color marking engine 20. Color marking engine 20 has the capability of printing multiple accent colors. An ASCII terminal 18 and keyboard 19 is used to view job status, configure RIP parameters, and resolve mismatches for resources or capabilities that were requested in the color document file but cannot be satisfied by the marking engine, such as request for a particular accent color that is not presently installed in the marking engine. For example if a document file specifies an accent color that is not installed in the marking engine 20, a message is displayed on the ASCII terminal 18 and the user is given the option to install the specified color in the marking engine or to allow the RIP to print with the current available colors.

Figure 2:
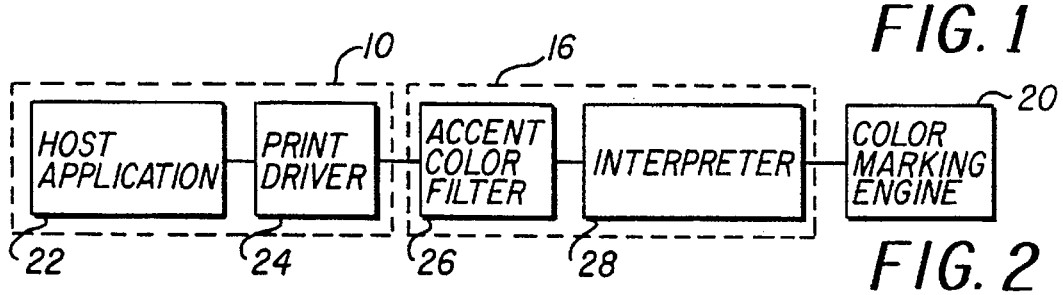
FIG. 2 is a schematic diagram showing the major software subsystems in the printing system of FIG. 1, employed to perform accent color printing according to the present invention.

Referring to FIG. 2, a block diagram of the major software subsystems of the color printing system is shown. The host computer contains a host application 22, such as Microsoft Word™, Aldus Pagemaker™, etc. that delivers a color document file expressed in generic page description commands for creating graphic objects such as letters, numbers, symbols, lines and shapes to a print driver 24. The print, driver 24 converts the generic page description commands to specific page description commands in a page description language such as Adobe PostScript™. The page description language contains process color commands indicating the color of the graphic objects. According to the present invention, the print driver 24 adds parameters for mapping the process colors to accent colors and sends the specific page description commands and color mapping parameters to an accent color filter 26 in the RIP 16. The accent color filter 26 employs the color mapping parameters to generate instructions for redefining the process color commands to generate accent color rather than process color, as described in detail below. The accent color filter 26 supplies the specific page description commands with the modified color commands to an interpreter 28. The interpreter 28 converts the page description commands and modified color commands to full page bitmaps, one for each accent color, for driving the marking engine 20.

The print driver 24 displays a color mapping table, Table 1, via the host computer monitor 11. The user can select a desired mapping from the process colors shown on the monitor (called "Display Color" in table 1) to the accent colors available on the marking engine 20 (called "Printer Color" in table 1) by indicating one of the Printer Colors for each display color using a pointing device such as the keyboard 19, or a mouse (not shown). In response to the user selection, the print driver 24 inserts color mapping parameters representing the selection into the specific page description commands.

TABLE 1

| Display Color | Printer Color |
| --- | --- |
| Red | [Automatic, Red, Green, Blue, Yellow, Black] |
| Green | [Automatic, Red, Green, Blue, Yellow, Black] |
| Blue | [Automatic, Red, Green, Blue, Yellow, Black] |
| Cyan | [Automatic, Red, Green, Blue, Yellow, Black] |
| Magenta | [Automatic, Red, Green, Blue, Yellow, Black] |
| Yellow | [Automatic, Red, Green, Blue, Yellow, Black] |
| All Bitmaps | [Automatic, Red, Green, Blue, Yellow, Black] |

If "Automatic" is chosen for any of the printer colors, the print driver 24 does not insert a color mapping parameter into the specific page description language for that particular display color. When no color mapping parameter is specified, the accent color filter 26 will use default values (as shown in Table 2 below) to map the display colors to the accent colors available in the marking engine 20.

The page description language can contain bitmapped images as well as graphic objects. Bitmapped images are treated differently than other process color graphic objects because they often contain color specifications that are not readily converted into accent color. The capability "All Bitmaps" is given to the user to specify which accent color they would like bitmapped images to be printed with. This allows the bitmapped images to be highlighted in a document. The interpreter 28 maps the colors in bitmapped images to shades of a single accent color.

Figure 3:
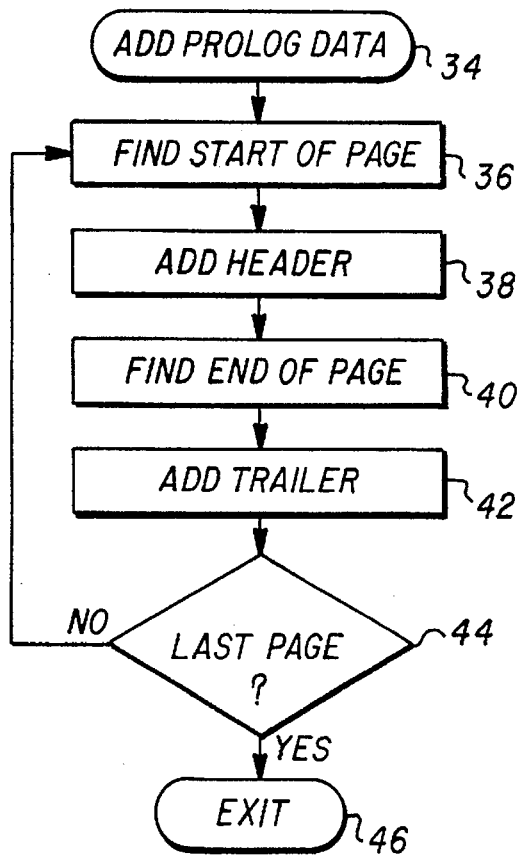
FIG. 3 is a flow chart showing the operations performed by the accent color filter.

Referring to FIG. 3, the operation of the accent color filter 26 will be described in more detail. The accent color filter 26 employs the color mapping parameters to generate an accent color prolog for the color document file which consists of instructions for redefining process color commands and additional commands that enable the interpreter 28 to trap the color commands within the color document file and convert the color commands to an accent color bitmap for each accent color. The accent color prolog data is inserted (34) at the top of the color document file. An accent color prolog written in the PostScript™ language for use in the Kodak 1580 Copier-Printer is included as Appendix A.

The accent color filter 26 reads the color document file until the start of a page is found (36). At the beginning of each page, the accent color filter 26 inserts a command (38) at the beginning of a page to save the page information to a temporary file. An example of the command in the PostScript™ language is "aReadPage". The accent color filter searches for the end of a page (40) and inserts a comment and a command at the end of the page to process the temporary file information multiple times based on the number of accent color s required for that page. An example of the comment and command in the PostScript™ language is "%%ENDPAGE" and "aSeparations". Next the accent color filter 26 searches for the last page (44). At the end of the last page, the accent color filter processes any remaining data, sends it on to the interpreter 28, and exits 50 the process. The interpreter 28 now processes the multiple images for each page and sends the bitmap images to the marking engine 20.

The method of mapping process color data to accent colors will now be described in more detail. The color mapping process used by the accent color prolog converts the color spaces, specified in RGB (Red, Green, Blue) and CMYK (Cyan, Magenta, Yellow, Black), all expressed as values between 0 and 1, into an HSB (Hue, Saturation, Brightness) color space. The hue is a value between 0 and 1 that indicates which of the following colors is being represented: red, green, blue, cyan, magenta or yellow. The brightness is a value between 0 and 1 that indicates whether Black, White, Gray, a Dark Color or a shade of one of the above colors is represented. The saturation is a value between 0 and 1 that is used to represent the shade of a color. The brightness value is the maximum of the RGB values. The saturation value is calculated as:

saturation value=(max(RGB)−min(RGB))/max(RGB).   (1)

A pseudo code formula for default mapping of HSB values to an accent color is shown in Table 2 below:

TABLE 2

```
if brightness = 0
    map color to black
else if saturation = 0
    if brightness = 1
        map color to white
    else
        map color to black
else
    percent accent color = saturation*brightness
    if brightness < .4
        map color to percent black =
            1 − (.3 R + .59 G + .11 B)*100.
    else
        map color to color indicated by hue using
            percent of accent color.
```

Table 3 shows the default color mapping decision resulting from the pseudo code formula of Table 2, and shows the default toner values for each display color.

TABLE 3

| Color | Hue | Saturation | Brightness | Default Toner |
|---|---|---|---|---|
| Black | 0 | 0 | 0 | Black |
| White | 0 | 0 | 1 | |
| Gray | 0 | 0 | >0–<1 | Black |
| Dark Colors | 0–1 | >0–1 | >0–.4 | Black |
| Red | .875–.999, 0–.125 | >0–1 | >.4–1 | Red |
| Yellow | >.125–<.208 | >0–1 | >.4–1 | Yellow or 50% Green |
| Green | .208–.458 | >0–1 | >.4–1 | Green |
| Cyan | >.458–<.542 | >0–1 | >.4–1 | 50% Blue |
| Blue | .542–.792 | >0–1 | >.4–1 | Blue |
| Magenta | >.792–<.875 | >0–1 | >.4–1 | 50% Red |

As shown in Table 3, Cyan, magenta and yellow (if yellow toner is not installed on the marking engine 20) colors are mapped to 50% of their default toner. If the user explicitly maps the display colors in the print driver 24, the colors are mapped to 100% of the accent color requested. Since a pure display color is represented by 100% of an accent color, there is no way to represent a darker shade of that display color without mixing a color toner with black toner. If the mixing of toners is not allowed in the marking engine 20, darker shades of a display color are represented by 40% to 100% of a toner when the brightness values is less than 0.98 as shown in the "Dark Colors" row of Table 3. If the brightness value is less than 0.4, a shade of gray is used to represent the color since, any color having a brightness value less than 0.4 is so dark that its color is perceived to be a shade of black.

As a color goes from very light to pure to black the colors will be represented as shown in the following color mapping formula expressed in pseudo code:

```
If brightness < .98
    brightness = 1 − brightness + .4
    percent accent color = brightness*saturation*100.
```

Several examples showing the process color represented in RGB values, the corresponding display color and the accent color resulting from process according to the present invention are shown in Table 4.

TABLE 4

| RGB Value | Disclay Color | Accent Color |
|---|---|---|
| 1.9.9 | Light Red | 10% Red |
| 1 0 0 | Pure Red | 100% Red |
| .9 0 0 | Darker Red | 50% Red |
| .4 0 0 | Very Dark Red | 88% Black |

The values in Table 4 show how the different shades of display colors are represented by accent colors according to the present invention.

If red, green, or blue toners are not available in the marking engine 20, and the display colors are mapped by the user to "Automatic" in the print driver 24, the display colors are represented by the first toner available in red, green, blue, yellow priority order and the percent black formula in Table 2 above is used to calculate the percent of accent color toner to use.

Table 3 and equation (1) above show the default color mapping that takes place in the accent color filter 26 if the user selects "Automatic" for any of the printer colors in the print driver 24 given the different combinations of red, green, blue and yellow toner installed in the marking engine 20. If the user explicitly maps a display color to a particular printer color in the print driver 24, the display color maps to 100% of the printer color.

Table 5 shows the default mapping if only one accent color toner and black toner are installed in the color marking engine 20. Each column of the table represents the mapping of display colors if only black and the accent color indicated at the top of the column are installed.

TABLE 5

Accent Colors(Black, Red, Green, Blue, Yellow)

| Display Color | R&Bk | G&Bk | B&Bk | Y&Bk |
|---|---|---|---|---|
| Black | 100% BK | 100% Bk | 100% Bk | 110% Bk |
| Dark Colors | %Bk | %Bk | %Bk | %Bk |
| Gray | %Bk | %Bk | %Bk | %Bk |
| Red | 100% R | 70% G | 70% B | 70% Y |
| Green | 41% R | 100% G | 41% B | 41% Y |
| Blue | 89% R | 89% G | 100% B | 89% Y |
| Cyan | 30% R | 30% G | 50% B | 30% Y |
| Magenta | 50% R | 59% G | 59% B | 56% Y |
| Yellow | 11% R | 11% G | 11% B | 100% Y |

Table 6 shows the default mapping if two accent color toners and black toner are installed in the color marking engine 20. Each column of the table represents the mapping of display colors if only black and the two accent colors indicated at the top of the column are installed.

TABLE 6

Accent Colors(Black, Red, Green, Blue, Yellow)

| Display Color | R, G&Bk | R, B&Bk | R, Y&Bk | G, B&Bk | G, Y&Bk | B, Y&Bk |
|---|---|---|---|---|---|---|
| Black | 100% Bk | 100% Bk | 100% Bk | 100% Bk | 100% Bk | 100% Bk |
| Dark Colors | %Bk | %Bk | %Bk | %Bk | %Bk | %Bk |
| Gray | %Bk | %Bk | %Bk | %Bk | %Bk | %Bk |
| Red | 100% R | 100% R | 100% R | 70% G | 70% G | 70% G |
| Green | 100% G | 41% R | 41% R | 100% G | 100% G | 41% B |
| Blue | 89% R | 100% B | 89% R | 100% B | 89% G | 100% B |
| Cyan | 30% R | 50% B | 30% R | 50% B | 30% G | 50% B |
| Magenta | 50% R | 50% R | 50% R | 59% G | 59% G | 59% B |
| Yellow | 50% G | 11% R | 100% Y | 50% G | 100% Y | 100% Y |

Table 7 shows the default mapping if three accent color toners and black toner are installed in the color marking engine 20. Each column of the table represents the mapping of display colors if only black and the three accent colors indicated at the top of the column are installed.

TABLE 7

Accent Colors (Black, Red, Green, Blue, Yellow)

| Display Color | R, G, B&Bk | R, G, Y&Bk | R, B, Y&Bk | G, B, Y&Bk |
|---|---|---|---|---|
| Black | 100% Bk | 100% Bk | 100% Bk | 100% Bk |
| Dark Colors | %Bk | %Bk | %Bk | %Bk |
| Gray | %Bk | %Bk | %Bk | %Bk |
| Red | 100% R | 100% R | 100% R | 70% G |
| Green | 100% G | 100% G | 41% R | 100% G |
| Blue | 100% B | | 100% B | 100% B |
| Cyan | 50% B | 49% R | 50% B | 50% B |
| Magenta | 50% R | 50% R | 50% R | 59% G |
| Yellow | 50% G | 100% Y | 100% Y | 100% Y |

The invention has been described with reference to a preferred embodiment. However, it will be appreciated that variations and modifications can be effected by a person of ordinary skill in the art without departing from the scope of the invention.

| PARTS LIST | |
|---|---|
| 10 | host computer |
| 11 | monitor |
| 12 | keyboard |
| 14 | color printing system |
| 15 | communication lines |
| 16 | raster image processor |
| 18 | ASCII terminal |
| 19 | keyboard |
| 20 | color marking engine |
| 22 | host application |
| 24 | print driver |
| 26 | accent color filter |

-continued

| PARTS LIST | |
|---|---|
| 28 | interpreter |
| 34 | add prolog data step |
| 36 | find start of page step |
| 38 | add header step |
| 40 | find end of page step |
| 42 | add page trailer step |
| 44 | test for last page step |
| 46 | exit step |

App. 1

APPENDIX A

```
%%BeginAccentProlog
/aInvFlg false def
/settransfer{dup length 3 eq{dup 1 get (exch)
eq{userdict/aInvFlg true put}if}if settransfer}bind def
/aEx{exch def}bind def
/aRGBstr 20 string def
/aDebug false def
/aSep 1 def
/aPrintImage false def
/aNseps 4 def
/aInput.1024 string def
/aDebugStatus false def
/AccentDict 10 dict def
/aADget{AccentDict exch get}def
/aADput{AccentDict 3 1 roll put}def
true setglobal
/aImgFlg false aADput
/aBlackToner true aADput
/aRedToner false aADput
/aGreenToner false aADput
/aBlueToner false aADput
/aShowCnt 0 aADput
/aLastSep 2 aADput
false setglobal
/aInitToners{
   /aImgFlg false aADput
   /aBlackToner true aADput
   /aRedToner false aADput
   /aGreenToner false aADput
   /aBlueToner false aADput
   /aLastSep 2 aADput
}def
/aSaveGlobals{/aImgFlg aADget/aBlackToner
aADget/aRedToner aADget/aGreenToner aADget/aBlueToner
aADget/aLastSep aADget/aShowCnt aADget 8 -1 roll}def
/aRestoreGlobals{/aShowCnt exch aADput/aLastSep exch
aADput/aBlueToner exch aADput/aGreenToner exch
aADput/aRedToner exch aADput/aBlackToner exch
aADput/aImgFlg exch aADput}def
% Purpose: Develop a standard set of redefinitions for
the image,
%          imagemask, and colorimage operators to 'nop'
the function
%          yet still consume the data so that an error
does not occur.

% Revision Info:   This version should be functional for
image, colorimage
%                  and imagemask commands.
%                  Call me at 69447 if questions or
problems.

userdict begin
```

App. 2

```
/DebugFlag false def

/BlankArea
{
  gsave
  1 setgray
  0 0 1 1 rectfill
  grestore
} bind def
/KDKimagedict 20 dict def
KDKimagedict begin /Str 30 string def /FlushFile
{ (Uh oh, big problem.  Multi source image with wrong #
of sources) =
  flush
  systemdict /stop get exec
} bind def % takes <any> and string and prints the string followed
by the
% type and contents of <any>
/Iprint
{ print dup type Str cvs print ( - ) print dup == flush
} bind def /PrintParams
{ BytesToRead Str cvs print
    ( - ) print NumSources Str cvs print
    ( Line length: ) print BytesToRead H div cvi =
    (Proc used: ) print /Proc load == flush
} bind def /ConsumeData
{ /BytesToRead BytesToRead NumSources mul store DebugFlag
  { PrintParams
  } if { 0 Proc
    { exec
      dup type (stringtype) ne
      { (Not string: ) Iprint
      } if
      length
      add
    } forall dup 0 le % Check for a nul string being returned by
the procedure
    { (No data returned from procedure) = flush
      pop exit
```

App. 3

```
    } if

BytesToRead exch sub /BytesToRead exch store
    BytesToRead 0 le
    { exit } if
   } loop
} bind def /CalcBTR
{ /BytesToRead W BPS mul
    { % The amount of bytes at the line level must be
divisable by 8
       dup 8 mod 0 eq
       { exit } if
       1 add
    } loop
  H mul 8 div cvi def   % Note: this is bytes per source
  BlankArea
} bind def /LookForFiles
{ % This is the area where I'm not sure it will work if
the three
   % data sources are separate files.  The code needs to
be changed
   % to substitute independent file variables.  The string
can be
   % reused since the data is just being thrown away.
   0 1 /Proc load length 1 sub
   { /I aEx
     /Proc load I get type (filetype) eq
     { /FileVar /Proc load I get def
       /InString BytesToRead H div cvi string def
       /Proc load I { FileVar InString readstring pop }
bind put
     } if
   } for
} bind def /CheckProcCount
{ /Proc load length NumSources lt
   {
     /Proc load length 1 eq
     {
       /BytesToRead BytesToRead NumSources mul def
       /NumSources 1 def
     }
     { FlushFile
     } ifelse
   } if
} bind def end /aImage
{ DebugFlag
```

App. 4

```
    { (
image called) = flush
    } if
    /aImgFlg true aADput
    dup type (dicttype) ne
    { % Level 1 image with 5 operands
      save 6 1 roll
      KDKimagedict begin
      /Proc exch
      DebugFlag
      { (Proc: ) Iprint
      } if
      1 array astore def
      DebugFlag
      { (Matrix: ) Iprint
      } if
      pop % Throw away the matrix
      /BPS exch
      DebugFlag
      { (BPS: ) Iprint
      } if
      def /H exch
      DebugFlag
      { (Height: ) Iprint
      } if
      def /W exch
      DebugFlag
      { (Width: ) Iprint
      } if
      def
      /NumSources 1 def
    }
    { % Level 2 image with a dictionary operand
      save exch
      KDKimagedict begin
      dup /Height get
      DebugFlag
      { (Height: ) Iprint
      } if
      /H aEx
      dup /Width get
      DebugFlag
      { (Width: ) Iprint
      } if
      /W aEx
      dup /DataSource get
      DebugFlag
      { (DataSource: ) Iprint
      } if
      /Proc exch dup xcheck not 1 index type (arraytype) eq
and not
      { 1 array astore
      } if
      def
      dup /BitsPerComponent get
      DebugFlag
```

App. 5

```
      { (BitsPerComponent: ) Iprint
      } if
      /BPS aEx
      /Decode get
      DebugFlag
      { (Decode: ) Iprint
      } if
      length 2 div /NumSources aEx
    } ifelse CalcBTR
    CheckProcCount
    LookForFiles
    ConsumeData end
    DebugFlag
    { (Exiting image) = flush
    } if
    restore
} bind def /aImagemask
{
   DebugFlag
   { (
imagemask called) = flush
   } if
   /aImgFlg true aADput
   dup type (dicttype) ne
   { % Level 1 imagemask with 5 operands
     save 6 1 roll
     KDKimagedict begin
     /Proc exch
     DebugFlag
     { (Proc: ) Iprint
     } if
     1 array astore def
     DebugFlag
     { (Matrix: ) Iprint
     } if
     pop % Throw away the matrix
     DebugFlag
     { (Boolean: ) Iprint
     } if
     pop % Throw away the boolean
     /BPS 1 def /H exch
     DebugFlag
     { (Height: ) Iprint
     } if
     def /W exch
     DebugFlag
     { (Width: ) Iprint
     } if
     def
     /NumSources 1 def
```

App. 6

```postscript
  }
  { % Level 2 imagemask with a dictionary operand
    save exch
    KDKimagedict begin
    dup /Height get
    DebugFlag
    { (Heigth: ) Iprint
    } if
    /H aEx
    dup /Width get
    DebugFlag
    { (Width: ) Iprint
    } if
    /W aEx
    dup /DataSource get
    DebugFlag
    { (DataSource: ) Iprint
    } if
    /Proc exch dup xcheck not 1 index type (arraytype) eq
and not
    { 1 array astore
    } if
    def
    dup /BitsPerComponent get
    DebugFlag
    { (BitsPerComponent: ) Iprint
    } if
    /BPS aEx
    /Decode get
    DebugFlag
    { (Decode: ) Iprint
    } if
    length 2 div /NumSources aEx
  } ifelse CalcBTR
  CheckProcCount
  LookForFiles
  ConsumeData end DebugFlag
  { (Exiting imagemask) = flush
  } if restore
} bind def /aColorimage
{ DebugFlag
  { (
colorimage called) = flush
  } if
  /aImgFlg true aADput
  % Level 1 colorimage with 7-10 operands
```

App. 7

```
save 2 index
{ 1 index
}
{ 1
} ifelse
7 add 1 roll

KDKimagedict begin
/NumSources exch
DebugFlag
{ (Num sources: ) Iprint
} if
def
/Multi exch
DebugFlag
{ (Multi flag: ) Iprint
} if
def Multi
{ NumSources array astore
}
{ 1 array astore
} ifelse /Proc exch
DebugFlag
{ (Proc: ) Iprint
} if
def DebugFlag
{ (Matrix: ) Iprint
} if
pop % Throw away the matrix
/BPS exch
DebugFlag
{ (BPS: ) Iprint
} if
def /H exch
DebugFlag
{ (Height: ) Iprint
} if
def /W exch
DebugFlag
{ (Width: ) Iprint
} if
def CalcBTR
CheckProcCount
ConsumeData end
DebugFlag
```

App. 8

```
    { (Exiting colorimage) = flush
    } if
    restore
} bind def end
/aRGB{realCURRENTRGB}def
/realRGB{systemdict/setrgbcolor get exec}bind def
/realGRAY{systemdict/setgray get exec}bind def
/realCMYK{systemdict/setcmykcolor get exec}bind def
/realCURRENTRGB{systemdict/currentrgbcolor get exec}bind
def
/realCURRENTCMYK{systemdict/currentcmykcolor get
exec}bind def
/realSETCOLOR{systemdict/setcolor get exec}bind def
/realSHOWPAGE{systemdict/showpage get exec}bind def
/realCOPYPAGE{systemdict/copypage get exec}bind def
/gsave{userdict /aRd known{userdict begin aRGB aC aM aY
aK 7 array astore/aGsave aEx end}if gsave}bind def
/grestore{grestore userdict /aRd known{userdict begin
aGsave aload pop/aK aEx/aY aEx/aM aEx/aC aEx/aBl aEx/aGr
aEx/aRd aEx end}if}bind def
/restore{aSaveGlobals systemdict/restore get exec
aRestoreGlobals}bind def
/aSaveState{userdict/aSave save put aStackSave
userdict/aSavedFlg true put}bind def
/showpage{aShowpage}bind def
/copypage{aCopypage}bind def
/ShowpageError{(Document contains multiple showpages
within accent page.) = flush aWriteBlack aWriteBlack
stop}def
/CopypageError{(Document contains copypage.  This is not
supported in Accent Color.) = flush aWriteBlack stop}def
/aDSCError{(Document does not contain %%Page: comment.
Cannot process job as accent.) = flush stop}def
/aSetCMYK false def
/setrgbcolor{userdict/aSetCMYK true put aRGBcolor}def
/aRGBcolor{realRGB}def
/setgray{aGray}def
/aGray{realGRAY}def
/setcmykcolor{aCMYKcolor}def
% ACCENT - Redefinition of setcmykcolor
/aCMYKcolor{userdict begin/aK aEx/aY aEx/aM aEx/aC aEx
end aC aM aY aK realCMYK realCURRENTRGB aRGBcolor}def
/sethsbcolor{aHSBcolor}def
% ACCENT - Redefinition of sethsbcolor
/aHSBcolor{systemdict/sethsbcolor get exec realCURRENTRGB
aRGBcolor}bind def
/currentrgbcolor{aRGB}bind def
/currentcmykcolor{aC aM aY aK}bind def
/setcolor{realSETCOLOR realCURRENTRGB aRGBcolor}def
% Redefine error handling routine for rangecheck which
% gets calls when readline exceeds input buffer
/RangeCheck false def
errordict begin
```

App. 9

```
   /*rangecheck/rangecheck load def % Save original
definition
   /rangecheck
   {
     % If not from readline, call original error routine
     dup/readline load eq not{errordict begin *rangecheck
end}{pop}ifelse
     /RangeCheck true def
     exch pop     % Pop -filetype- off stack
     true  % Push true for status from readline
   } bind def
end
/image{aDebug{(IMAGE ) print aPrintImage = flush}if
aPrintImage{systemdict/image get exec}{aImage}ifelse}def
/colorimage{aDebug{(COLORIMAGE ) print aPrintImage =
flush}if aPrintImage{systemdict/colorimage get
exec}{aColorimage}ifelse}def
/aStackSave{/dict_count countdictstack def count array
astore/aStackArray aEx}def
/aStackRestore{clear aStackArray aload pop countdictstack
dict_count sub{end}repeat}def
/PageInfo (pageinfo) (w) file def
/aWriteBlack{PageInfo (\017\000\000\000) writestring
PageInfo flushfile}def
/aShowpage{realSHOWPAGE aWriteBlack}bind def
/aCopypage{realCOPYPAGE aWriteBlack}bind def
/aDoSetPage{setpagedevice}bind def
/setpagedevice{aSetPage}bind def
/aSetPage{aDoSetPage}bind def
/aSetPageError{aSep 1 eq{(Document contains setpagedevice
within accent page. Setpagedevice not processed.) =
flush}if pop}def
%%EndAccentProlog %%BeginAccentSetup
userdict begin
/aRGB{aRd aGr aBl}def
userdict/WinInv known{/aInvFlg true def}if
userdict/invertflag known{/aInvFlg true def}if
/aShowpage{/aShowCnt/aShowCnt aADget 1 add
aADput/aShowCnt aADget 1
gt{ShowpageError}{aProcess{aInvFlg{aInvert}if
realSHOWPAGE
aInvFlg{aInvert}if}{erasepage}ifelse}ifelse}bind def
/aInvert{[{1 exch sub} /exec load currenttransfer /exec
load] cvx settransfer}bind def
/aCopypage{CopypageError realCOPYPAGE}bind def
/DumpRGB{pop}def
aInvFlg{/aBLACK 1 def/aWHITE 0 def}{/aBLACK 0 def/aWHITE
1 def}ifelse
/aRGB2WH{/aRd //aWHITE def/aGr //aWHITE def/aBl //aWHITE
def/aC 0 def/aM 0 def/aY 0 def/aK //aBLACK def}def
```

App. 10

```
/aRGB2BK{/aRd //aBLACK def/aGr //aBLACK def/aBl //aBLACK
def/aC 0 def/aM 0 def/aY 0 def/aK //aWHITE def}def
aRGB2BK
% ACCENT - Set default print WHITE and setgray to print
WHITE
/aBk2Wh{
   //aWHITE realGRAY
}bind def
/setRGB{
   aInvFlg{3{1 exch sub 3 1 roll}repeat}if
   /aBl aEx/aGr aEx/aRd aEx
   aRGB realRGB
   aSetCMYK{realCURRENTCMYK /aK aEx/aY aEx/aM aEx/aC
aEx}if
   currenthsbcolor /aB aEx/aS aEx/aA aEx aB aS mul/aD aEx
}bind def
/aWriteInfo{
   /aImgFlg aADget{/aBlackToner true aADput}if
   PageInfo/aBlackToner aADget{15/aLastSep 1
aADput}{0}ifelse write
   PageInfo/aRedToner aADget{7/aLastSep 2 aADput}{0}ifelse
write
   PageInfo/aBlueToner aADget{2/aLastSep 3
aADput}{0}ifelse write
   PageInfo/aGreenToner aADget{4/aLastSep 4
aADput}{0}ifelse write
   /aLastSep aADget 1 le{/aLastSep dup aADget 1 add
aADput}if
   PageInfo flushfile
}def
aInvFlg{/aColor{aD realGRAY}bind def}{/aColor{1 aD sub
realGRAY}bind def}ifelse
/aLkUp{
   {
     aB 0 eq{aBlack exit}if %/Black
     aS 0 eq{aB 1 eq{aWhite}{aBlack}ifelse exit}if
%White/Gray
     aB .4 le{aBlack exit}if % Real Dark Colors
     aB .98 lt{/aD 1 aB sub .4 add aS mul def}if % Darker
Colors
     aA .875 ge aA .125 le or{aRed exit}if
     aA .208 ge aA .458 le and{aGreen exit}if
     aA .542 ge aA .792 le and{aBlue exit}if
     aA .458 ge aA .542 le and{aCyan exit}if
     aA .792 ge aA .875 le and{aMagenta exit}if
     aA .125 ge aA .208 le and{aYellow exit}if
   }bind loop
}bind def
/aRGBcolor{userdict begin setRGB aLkUp /aSetCMYK false
def end}def
/aBlackProc{
   userdict begin
   aRGB2BK
   /aPrintImage true def
   /aWhite{//aWHITE realGRAY}def
```

App. 11

```
    /aGray{userdict begin dup/aRd aEx dup/aGr aEx dup/aBl
aEx dup 1 exch sub/aK aEx/aC 0 def/aM 0 def/aY 0 def end
realGRAY}def
    /aBlack{aRGB realRGB/aBlackToner true aADput}bind def
    /aRed{//aWHITE realGRAY/aRedToner true aADput}bind
def
    /aGreen{//aWHITE realGRAY/aGreenToner true
aADput}bind def
    /aBlue{//aWHITE realGRAY/aBlueToner true aADput}bind
def
    /aCyan{//aWHITE realGRAY/aBlueToner true aADput}bind
def
    /aMagenta{//aWHITE realGRAY/aRedToner true
aADput}bind def
    /aYellow{//aWHITE realGRAY/aGreenToner true
aADput}bind def
    0 setgray 0 0 0 setrgbcolor
  end
} bind def
/aRedProc{
  userdict begin
    aRGB2WH
    aBk2Wh
    /aWhite{//aWHITE realGRAY}def
    /aGray{userdict begin pop //aWHITE dup/aRd aEx
dup/aGr aEx dup/aBl aEx dup/aC aEx dup/aM aEx dup/aY aEx
dup/aK aEx end realGRAY}def
    /aBlack{//aWHITE realGRAY}bind def
    /aRed{aColor}bind def
    /aGreen{//aWHITE realGRAY}bind def
    /aBlue{//aWHITE realGRAY}bind def
    /aCyan{//aWHITE realGRAY}bind def
    /aMagenta{/aD aD 0.5 mul def  aColor}bind def
    /aYellow{//aWHITE realGRAY}bind def
    /aPrintImage false def
  end
} bind def
/aGreenProc{
  userdict begin
    aRGB2WH
    aBk2Wh
    /aWhite{//aWHITE realGRAY}def
    /aGray{userdict begin pop //aWHITE dup/aRd aEx
dup/aGr aEx dup/aBl aEx dup/aC aEx dup/aM aEx dup/aY aEx
dup/aK aEx end realGRAY}def
    /aBlack{//aWHITE realGRAY}bind def
    /aRed{//aWHITE realGRAY}bind def
    /aGreen{aColor}bind def
    /aBlue{//aWHITE realGRAY}bind def
    /aCyan{//aWHITE realGRAY}bind def
    /aMagenta{//aWHITE realGRAY}bind def
    /aYellow{/aD aD 0.5 mul def  aColor}bind def
    /aPrintImage false def
  end
} bind def
/aBlueProc{
```

App. 12

```
   userdict begin
     aRGB2WH
     aBk2Wh
     /aWhite{//aWHITE realGRAY}def
     /aGray{userdict begin pop //aWHITE dup/aRd aEx
dup/aGr aEx dup/aBl aEx dup/aC aEx dup/aM aEx dup/aY aEx
dup/aK aEx end realGRAY}def
     /aBlack{//aWHITE realGRAY}bind def
     /aRed{//aWHITE realGRAY}bind def
     /aGreen{//aWHITE realGRAY}bind def
     /aBlue{aColor}bind def
     /aCyan{/aD aD .0.5 mul def  aColor}bind def
     /aMagenta{//aWHITE realGRAY}bind def
     /aYellow{//aWHITE realGRAY}bind def
     /aPrintImage false def
   end
} bind def
/aReadPage
{
   /Filvar (accentpage) (w) file def
   { currentfile aInput readline exch
     dup (%%ENDPAGE) eq{pop pop Filvar closefile exit}if
     Filvar exch writestring
     RangeCheck not{Filvar (\n) writestring}{/RangeCheck
false def}ifelse
     not{ Filvar closefile exit}if
   } bind
   loop
}bind def
/aSeparations % Process separations for page
{
   userdict begin/aPageN aPageN 1 add def end
   aInitToners
   userdict/aSep 1 put
   /aSetPage{aSetPageError}bind def
   4{ % Loop through the 4 separations
     aSep 1 eq{
        % aBlack Separation
        aBlackProc
        /aBlackToner aADget/aProcess aEx
     }if
     aSep 2 eq{
        % Red Separation
        aRedProc
        /aRedToner aADget/aProcess aEx
     }if
     aSep 3 eq{
        % Blue Separation
        aBlueProc
        /aBlueToner aADget/aProcess aEx
     }if
     aSep 4 eq{
        % Green Separation
        aGreenProc
        /aGreenToner aADget/aProcess aEx
     }if
```

App. 13

```
    aProcess aSep/aLastSep aADget eq or{
       /aShowCnt 0 aADput
       userdict/aSavedFlg false put
       aSep/aLastSep aADget lt{userdict/aSave save put
aStackSave userdict/aSavedFlg true put}if
       (accentpage)run
       aSep 1 eq{aWriteInfo}if
       aSep/aLastSep aADget lt{aStackRestore aSave
restore}{userdict/aSavedFlg get{aSave pop}if}ifelse
       aDebugStatus{(VM = ) print vmstatus exch sub =
(Save Level=) print = flush}if
    }if
    userdict begin 1 aSep add/aSep aEx end
  }repeat
  /aSetPage{aDoSetPage}bind def
} bind def
/PageInfo (pageinfo) (w) file def
/aPageN 0 def
end
%%EndAccentSetup
```

We claim:

1. A method for printing a color document file having page description commands including process color commands for graphic objects and bitmapped images on an accent color printer, comprising the steps of:
   a. assigning a particular accent color and shade to each primary color and assigning a particular accent color to all bitmapped images;
   b. providing a print driver responsive to the color document file and particular color assignments for adding color mapping parameters to the color document file to produce a modified color document file;
   c. providing a raster image processor connected to the print driver and responsive to the modified color document file for mapping the process color commands in the color document file to a shade of a particular accent color for each graphic object, for mapping the process color commands for all bitmapped images to a specified accent color, and producing a plurality of full page bitmaps, one for each accent color;
   d. providing a print engine capable of printing a plurality of accent colors, the print engine being connected to the raster image processor for receiving the full page bitmaps and printing an accent color document; and
   e. supplying the color document file to the print driver and raster image processor for printing the accent color document.

2. The method for printing a color document file claimed in claim 1, wherein the raster image processor comprises an accent color filter responsive to the document file and the mapping parameters for generating instructions for redefining the process color commands to generate accent color rather than process color, and an interpreter responsive to the instructions from the accent color filter for producing the full page bitmaps.

3. The method for printing a color document file claimed in claim 1, wherein the raster image processor includes a display for displaying color assignment choices and an ASCII terminal; and the step of assigning colors is performed by an operator via the ASCII terminal.

4. The method for printing a color document file claimed in claim 2, wherein the step of assigning colors is performed automatically by the accent color filter.

5. A method for printing a color document file having page description commands including process color commands and bitmapped images on an accent color printer, comprising the steps of:
   a. providing a print engine capable of printing a plurality of accent colors;
   b. providing a raster image processor for mapping the process color commands to display color data and for mapping the display color data to specified shades of specified accent colors, and for mapping the bitmapped images to a specified accent color;
   c. presenting a menu to a user listing display colors, bitmapped images, and possible accent colors;
   d. selecting from the menu a specific accent color for each display color and all bitmapped images;
   e. inserting commands into the color document file representing the selection made by the user to produce a modified color document file; and
   f. supplying the modified color document file to the raster image processor for printing the accent color document.

6. The method for printing a color document file claimed in claim 5, wherein the step of assigning a particular accent color further includes assigning a specified accent color to a primary color when the brightness of the primary color is less than a predetermined threshold.

7. The method for printing a color document file claimed in claim 5, wherein the print engine is capable of printing black and, wherein the step of assigning a particular accent color further includes assigning black to a primary color when the brightness of the primary color is less than a predetermined threshold.

8. The method of printing a color document file claimed in claim 5, wherein the print engine performs one pass per accent color and further including the steps of:
   a. determining the number of accent colors required for each page of a document; and
   b. performing only the minimum number of passes required to print each page.

9. An accent color printing system for printing a color document file having page description commands including process color commands for graphic objects and bitmapped images, comprising:
   a. means for assigning a particular accent color and shade to each primary color and assigning a particular accent color to all bitmapped images;
   b. a print driver responsive to the color document file and particular color assignments for adding color mapping parameters to the color document file to produce a modified color document file;
   c. raster image processor connected to the print driver and responsive to the modified color document file for mapping the process color commands in the color document file to a shade of a particular accent color for each graphic object, for mapping the process color commands for all bitmapped images to a specified accent color, and producing a plurality of full page bitmaps, one for each accent color; and
   d. a print engine capable of printing a plurality of accent colors, the print engine being connected to the raster image processor for receiving the full page bitmaps and printing an accent color document.

10. The accent color printing system claimed in claim 9, wherein the raster image processor comprises an accent color filter responsive to the document file and the mapping parameters for generating instructions for redefining the process color commands to generate accent color rather than process color, and an interpreter responsive to the instructions from the accent color filter for producing the full page bitmaps.

11. The accent color printing system claimed in claim 9, wherein the raster image processor includes a display for displaying color assignment choices and an ASCII terminal; and the means for assigning colors enables the colors to be assigned by an operator via the ASCII terminal.

12. The accent color printing system claimed in claim 9, wherein the means for assigning colors performs the color assignment automatically.

13. An accent color printing system for printing a color document file having page description commands including process color commands and bitmapped images, comprising:
   a. a print engine capable of printing a plurality of accent colors;
   b. a raster image processor for mapping the process color commands to display color data and for mapping the display color data to specified shades of specified accent colors, and for mapping the bitmapped images to a specified accent color;

c. means for presenting a menu to a user listing display colors, bitmapped images, and possible accent colors;

d. means for selecting from the menu a specific accent color for each display color and all bitmapped images; and e. means for inserting commands into the color document file representing the selection made by the user to produce a modified color document file.

14. The accent color printing system claimed in claim 13, wherein the means for assigning a particular accent color further includes means for assigning a specified accent color to a primary color when the brightness of the primary color is less than a predetermined threshold.

15. The accent color printing system claimed in claim 13, wherein the print engine is capable of printing black and, wherein means for assigning a particular accent color further includes means for assigning black to a primary color when the brightness of the primary color is less than a predetermined threshold.

16. The accent color printing system claimed in claim 13, wherein the print engine performs one pass per accent color and further including:

a. means for determining the number of accent colors required for each page of a document; and b. means for performing only the minimum number of passes required to print each page.

\* \* \* \* \*